United States Patent
Zellner et al.

(10) Patent No.: US 7,584,895 B2
(45) Date of Patent: Sep. 8, 2009

(54) TRANSACTIONAL CARDS WITH SENSORY FEATURES

(75) Inventors: Samuel Zellner, Dunwoody, GA (US); Elizabeth Wagner, Atlanta, GA (US); Steven Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 11/468,285

(22) Filed: Aug. 29, 2006

(65) Prior Publication Data

US 2008/0054077 A1    Mar. 6, 2008

(51) Int. Cl.
    *G06K 19/00* (2006.01)
(52) U.S. Cl. .................. 235/487; 235/492
(58) Field of Classification Search ............... 235/487, 235/488, 491, 492, 494, 375; 340/5.32; 359/619
    See application file for complete search history.

(56) References Cited

U.S. PATENT DOCUMENTS

| | | | |
|---|---|---|---|
| 4,941,172 A | 7/1990 | Winebaum | |
| 5,412,192 A * | 5/1995 | Hoss | 235/380 |
| 5,509,056 A | 4/1996 | Ericsson | |
| 5,539,819 A | 7/1996 | Sonoyama | |
| 5,700,037 A | 12/1997 | Keller | |
| 5,746,451 A | 5/1998 | Weyer | |
| 5,748,713 A | 5/1998 | Kovacs | |
| 5,764,742 A | 6/1998 | Howard | |
| 5,844,230 A | 12/1998 | Lalonde | |
| 5,963,637 A | 10/1999 | Arzoumanian | |
| 5,984,191 A | 11/1999 | Chapin | |
| 6,016,225 A * | 1/2000 | Anderson | 359/619 |
| 6,068,183 A * | 5/2000 | Freeman et al. | 235/492 |
| 6,484,940 B1 | 11/2002 | Dilday | |
| 6,747,930 B1 | 6/2004 | Weldon | |
| 6,793,141 B1 | 9/2004 | Graham | |
| 7,163,153 B2 | 1/2007 | Blossom | |
| 7,191,952 B2 | 3/2007 | Blossom | |
| 7,197,134 B1 | 3/2007 | Ruckart | |
| 2002/0065712 A1 | 5/2002 | Kawan | |
| 2002/0188863 A1 | 12/2002 | Friedman | |
| 2003/0036425 A1 | 2/2003 | Kaminkow | |
| 2003/0045267 A1 | 3/2003 | Himmel | |
| 2003/0089774 A1 | 5/2003 | Schmieder | |
| 2004/0011877 A1 | 1/2004 | Reppermund | |
| 2005/0040240 A1 | 2/2005 | Jones | |
| 2005/0167487 A1 | 8/2005 | Conlon | |

(Continued)

FOREIGN PATENT DOCUMENTS

JP    2121117    5/1990

(Continued)

*Primary Examiner*—Daniel St.Cyr
(74) *Attorney, Agent, or Firm*—Myers Bigel Sibley & Sajovec, P.A.

(57) ABSTRACT

Transactional cards such as credit and debit cards include sensory features including sounds, sights, and/or smells to increase the interest in the transactional card. A transactional card may include circuitry for producing sounds such as sound effects, songs, and catch phrases. A transactional card may include circuitry for producing light, such as illuminating the account numbers and/or producing graphical displays on the card. A transactional card may include coatings or integrated materials that provide scents or that change color when heat is applied. A transactional card may include additional sensory features such as a lenticular array with underlying image.

16 Claims, 2 Drawing Sheets

U.S. PATENT DOCUMENTS

| | | |
|---|---|---|
| 2006/0186209 A1 * | 8/2006 | Narendra et al. ............ 235/492 |
| 2006/0283957 A1 * | 12/2006 | Blumenfeld et al. ........ 235/487 |

FOREIGN PATENT DOCUMENTS

| | | |
|---|---|---|
| JP | 5205115 | 8/1993 |
| JP | 2000148941 | 5/2000 |
| JP | 2002024782 | 1/2002 |
| JP | 2003001974 | 1/2003 |

* cited by examiner

TRANSACTIONAL CARDS WITH SENSORY FEATURES

TECHNICAL FIELD

Embodiments are related to transactional cards carried by individuals. More particularly, the embodiments are related to transactional cards having sensory features.

BACKGROUND

Transactional cards such as credit cards, debit cards, and gift cards are carried by many individuals. Conventionally, such transactional cards contain a machine readable element, such as a bar code, a magnetic strip, or a radio frequency identification (RFID) chip that has an account number encoded thereon. The transactional cards typically include the account number in visible, raised numerals and may also include the name of the card holder. Other text may also be included such as the name of the card issuer and the regulations for use.

In an effort to differentiate transactional cards from one issuer to another, issuer specific logos may be included while various color schemes and printed images may also be present. However, there are no other sensory features provided on the transactional cards. Card holders may prefer additional sensory features to enhance the desirability of the transactional card and/or to individualize the transactional card.

SUMMARY

Illustrative embodiments address these issues and others by providing transactional cards with various sensory features. For example, transactional cards may be provided with circuitry to produce light and/or sound. As other examples, the transactional card may include materials that produce scents and/or change color in response to heat.

One embodiment is a transactional card that includes a sheet including a machine readable element. The transactional card further includes circuitry for producing sound affixed to the sheet.

Another embodiment is a transactional card that includes a sheet including a machine readable element. The transactional card further includes circuitry for producing light affixed to the sheet.

Another embodiment is a transactional card that includes a sheet including a machine readable element and wherein the sheet includes a material producing a scent.

DETAILED DESCRIPTION

Illustrative embodiments provide sensory features on transactional cards so as to make the transactional card more desirable for card holders. Sensory features may include sights, sounds, and/or smells that make the transactional card more interesting for the user. Furthermore, such sensory features may be selected by the card holder to allow the card holder to individualize the transactional card.

Figure 1:
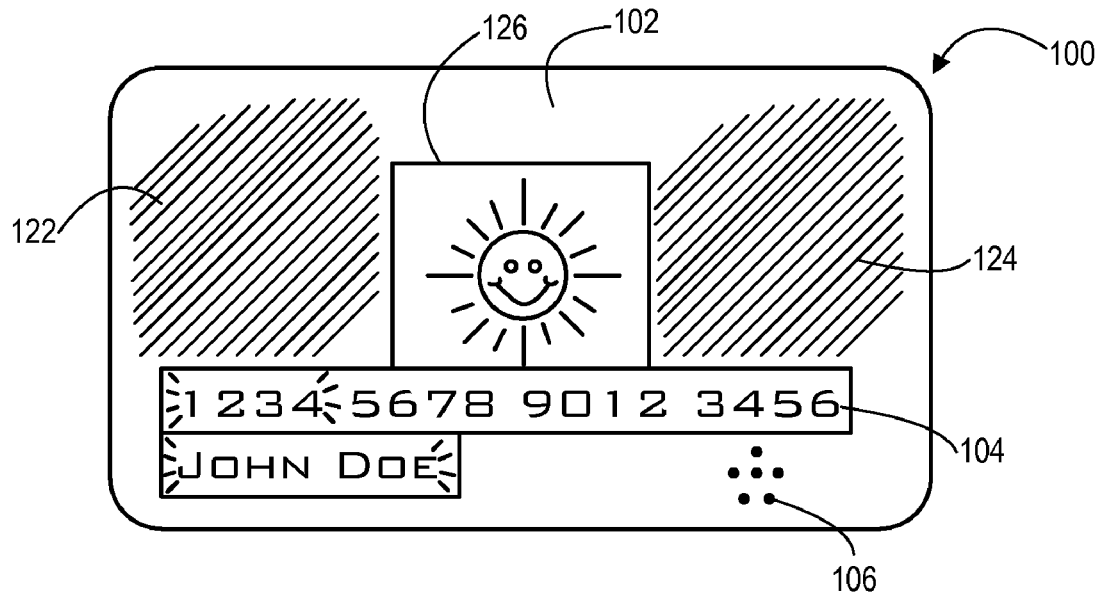
FIG. 1 is a view of a front side of a transactional card according to an illustrative embodiment.
Figure 2:
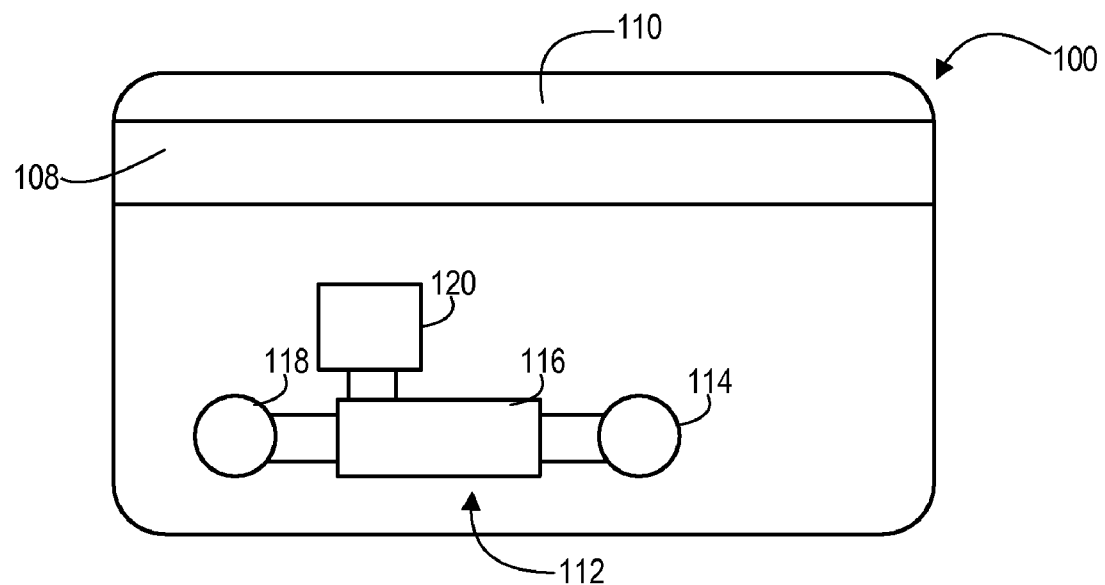
FIG. 2 is a view of a back side of a transactional card according to the illustrative embodiment of FIG. 1.
Figure 3:
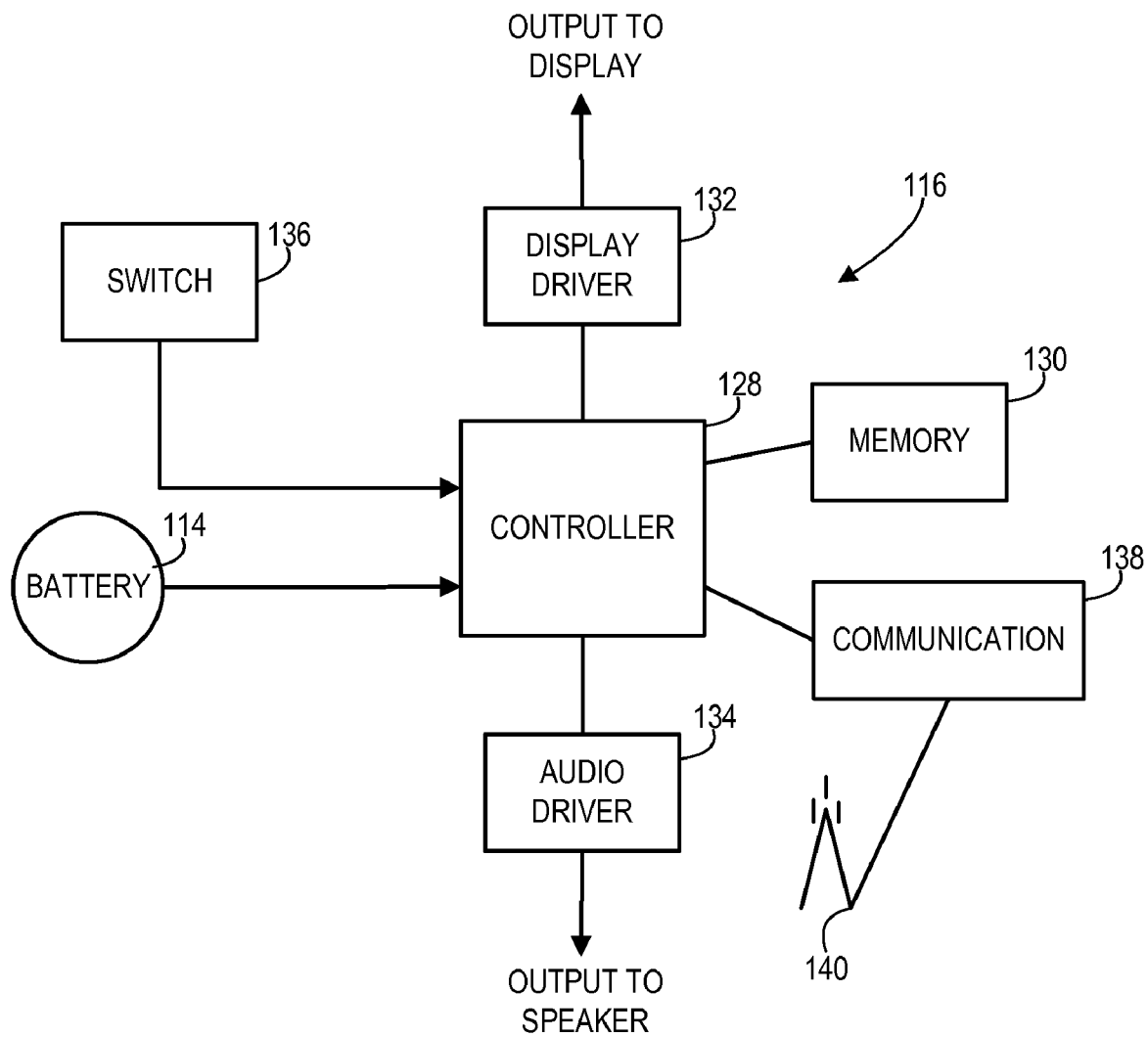
FIG. 3 is a functional diagram of circuitry included for the illustrative embodiment of FIG. 1 to produce light and sound.

FIG. 1 shows a front side 102 of one embodiment of a transactional card 100 while FIG. 2 shows the back side 110. This embodiment includes a variety of additional sensory features that are discussed below. However, it should be appreciated that the number of sensory features that are present for various embodiments may differ from that shown in FIG. 1, and the embodiment of FIGS. 1-3 is shown only for purposes of illustration.

The transactional card 100 may be constructed similarly to a conventional transactional card using well known techniques and using well known materials for producing transactional cards. For example, the transactional card 100 may be constructed of plastic or other rigid or semi-rigid materials. The transactional card 100 has a machine readable element, such as a strip 108, located on the back side 110. The machine readable element 108 may be one of various types, such as a magnetic strip, a bar code, an embedded RFID chip, and any other machine readable element capable of providing information associated with a card holder and/or a card issuer. An account number associated with the transactional card 100 is encoded on the machine readable element 108 so that the account number can be acquired when the transactional card 100 is swiped at a card reader device.

As shown, this particular embodiment includes an audio output 106, such as one or more small apertures that emit sound that the card holder and others can hear. Examples of such sounds include short songs, catch phrases, the name of the card holder, one or more customized audible messages, and the like. The audio signal is produced by an integrated circuit 116 embedded into the plastic or other material of the transactional card 100. The integrated circuit 116 is shown as being exposed on the back side 110 but it will be appreciated that the circuit 116 may be encapsulated. The integrated circuit 116 receives power from a battery 114 or other electrical energy source such as a super-capacitor and provides an audio signal to a speaker 118 that emits sound, either from the back side 110 or through the apertures 106 of the front side 102.

It will be appreciated that the integrated circuit 116 may provide control by outputting the audio signal in response to an input, such as a pressure sensitive switch that closes upon the card holder grasping the transactional card 100. Such control allows the audio signal to be provided only when desired, and to last until a set amount of time elapses or until the audio information (i.e., song, phrase, etc.) completes one or more cycles.

The battery 114 may be of the lithium ion watch battery type which has a thickness suitable for mounting in an embedded location of the transactional card 100 or may be of other types that aren't necessarily embeddable. Furthermore, as noted above, the electrical energy source may be a device other than a battery, such as a super-capacitor that may store rapid pulses of power and thereby receive virtually instant electrical charge.

The speaker 118 may be of the piezoelectric variety which also has a thickness suitable for mounting in an embedded location or may be of other types that are not necessarily embeddable. Other forms of small or miniaturized transducers may also be utilized as the speaker 11 8.

In addition to providing audio, this embodiment also provides lighting in order to provide more interesting visual features. As one example of lighting, this embodiment provides a panel 104 that illuminates the account number. The account number may be illuminated by having backlighting with dark numerals or having the numerals themselves be illuminated amidst a darker background. Such backlighting or otherwise lighting of the account number of other information on the card 100 may be useful in identifying one's card in a poorly lit atmosphere. Additionally, a panel 104 may similarly illuminate the name of the card holder. Furthermore, a panel 126 may provide a graphical display which may be static or may change to provide animation. Such a panel 126 may be provided to display images of various resolutions, avatars, and the like. Furthermore, one or more of the panels 104, 126 may display customized messages such as for prepaid gift cards. As another example, the panel 104 may display an image related to what the card 100 may be used to purchase, such as an advertisement for a particular product or brand of product or retailer. These panels may utilize various miniaturized illumination technologies such as light emitting diodes (LEDs) or liquid crystal displays (LCDs).

The integrated circuit 116 may also include circuitry necessary to activate the one or more LEDs, or LCDs that are present. The integrated circuit 116 provides a control signal output via a multi-pin connection 120 to the panels 104, 126 in order to control lighting or generate the numerals and graphical images.

As an alternative for this embodiment, panel 126 may be a lenticular sheet with one or more underlying graphical images. In that case, the image may appear to be three-dimensional, appear to have motion, or to otherwise give the card holder an additional sensory feature. The underlying image may be of subject matter such as that discussed above for a graphical display, including an avatar, a photographic image, and the like. Details regarding the lenticular process and lenticular arrays may be found at http://www.lpc-europe.com/lenticular_process.shtml and examples can be seen at http://www.lenticularimaging.com/index.shtml, both of which are incorporated by reference herein.

Another visible sensory feature provided on this embodiment includes a heat sensitive color-changing material such as a coating 122 or an integral material of the sheet forming the card 100. In this example, the coating 122 is applied on the outer surface of the sheet that forms the transactional card 100. Such heat sensitive color-changing coatings are well known. The coating 122 or integrated material may be chosen so that it has a particular color at room temperature but a substantially different color when warmed, such as when pressure is applied. Then, when the user grasps the transactional card 100 by touching the coating 122 or integrated material, the temperature of the coating 122 or integrated material changes from room temperature to the temperature of the user such that the color of the coating 122 or integrated material also changes to provide an interesting visual effect. As shown, the coating 122 or integrated material is applied to only a portion of the front side 102. However, it will be appreciated that the coating 122 or integrated material may be applied to larger portions or all of the front side 102 and/or the back side 110.

In addition to providing audio and visual sensory features, the transactional card 100 also provides olfactory sensory features. For example, a scent-releasing material, such as a coating 124, is applied on the outer surface of the sheet that forms the transactional card 100 or is integrated into the sheet itself rather than being coated thereon. Such scent-releasing coatings 124 or integrated materials are well known and may also be heat sensitive such that the scent is released primarily when the coating 124 or integrated material is warmed above room temperature, for example, when being grasped by the card holder. The scent-releasing coatings 124 or integrated material may be chosen from one of many varieties of available scents, such as certain flowers or foods.

Furthermore, scented and/or heat sensitive labels may be applied to the card.

Examples and/or details for such scented labels may be found at
http://www.printmeprim.com/store/WsDefault.asp?Cat=ScentLabels,
http://www.aero.si/ps/prom_tix.htm,
http://www.paperspecs.com/resources/tips/200561516195.htm,
http://www.microscent.com, each of which is incorporated herein by reference.

Examples and/or details for such heat sensitive labels may be found at
http://www.drypak.com/index.asp?cat-62759 and
http://www.futurehealth.org/stressma.htm, each of which is incorporated by reference.

It will be appreciated that each of the sensory features discussed above in relation to FIGS. 1 and 2 may exist individually on transactional cards or may exist in different combinations on a single transactional card. It will be further appreciated that card issuers may offer card holders choices of these sensory features when a new card is being issued. Furthermore, the card issuer may provide for downloadable updates so that users may further customize and/or alter their cards.

FIG. 3 shows a functional diagram of the integrated circuit 116 that provides control for the audio and visual sensory features of the embodiment of FIGS. 1 and 2. The integrated circuit 116 of this example includes a controller 128 that accesses a memory 130. The controller 128 implements a control algorithm to respond to an input from the card holder, such as grasping the card, to trigger an input device 136, such as a pressure sensitive switch, that is embedded within the transactional card 100. Once triggered, the controller 128 activates whatever output device is available, such as an audio driver 134 that provides an audio output signal to the speaker 118 and/or a display driver 132 that provides a display signal to the connector 120.

To produce the audio output signal and/or the display signal, the integrated circuit 116 may access audio and/or display data stored in memory 130. The memory 130 may be programmed with the data at the time of manufacture of the card. For example, the card issuer may have preset options from which the card holder can choose from when designing the card. Furthermore, custom audio or display information may be provided by the card holder to be stored within the memory 130.

In addition to being programmable at the time of manufacture, the memory 130 of certain embodiments may also be programmable after manufacture so that new audio and/or display data may be added or old data may be removed. Electrical contacts necessary to communicate with the memory 130 may be exposed on the surface of the transactional card 100 or electric or magnetic coupling technologies may be employed to transfer data to the memory 130. Furthermore, as discussed below, a communication system 138 may be included to facilitate external interaction with the memory 130.

The memory 130 may be removable. As such, rather than reprogramming the memory 130 for new audio and/or visual information by interacting with the card 130, the memory 130 may be removed and reprogrammed or removed and replaced with a different memory element.

As discussed above, the integrated circuit 116 may include both audio and display capability. However, for cards where only audio capability is desired, then the circuit may include only the audio functionality. Similarly, for cards where only display capability is desired, then the circuit may include only the display functionality. Furthermore, for cards where both audio and display functionality is desired, the functionality for each may be provided by separate circuitry as opposed to consolidating the functionality of both into a single integrated circuit.

Additionally, it will be appreciated that while the functionality has been discussed in the context of an integrated circuit 116, the circuitry may be discrete rather than integrated. Furthermore, for simple functions like turning an LED on and off to light up the card, the circuitry need only include basic features, such as only an on/off switch linking the LED to the battery, or an on/off switch that is linked to a timer to automatically turn the switch off once a certain amount of time elapses.

More advanced functionality may also be integrated into the transactional card 100. For example, the circuitry 116 of the transactional card 100 may include a communications system 138 with a communications interface 140. As one specific example, the communication system may be a short range radio frequency transceiver that follows a well-known protocol such as the Bluetooth® protocol or a proprietary protocol as an alternative. The communication system 138 may utilize an interface 140 such as an antenna for wireless communications or a wired connector (e.g., IEEE 1394 or USB). The controller 128 may utilize the communication system to transfer data into and out of the memory 130. The memory 130 may store parameters such as the number of times the card has been read by a machine and this data may be downloaded to a computer system for analysis. Furthermore, the audio sounds and messages as well as the display images, lighting patterns, and so forth may be stored in memory 130 and may be transferred from a computer to the transactional card via the communications system 138.

While illustrative embodiments have been particularly shown and described, it will be understood by those skilled in the art that various other changes in the form and details may be made therein without departing from the spirit and scope of the invention.

What is claimed is:

1. A transactional card, comprising:
    a sheet of material including a machine readable element;
    a removable memory element that contains audio data;
    circuitry affixed to the sheet producing visible light via a light emitting diode that causes at least one of an account number permanently affixed to the sheet and a card holder's name permanently affixed to the sheet to be illuminated; and
    sound producing circuitry affixed to the sheet, the sound producing circuitry comprising:
        a power supply,
        an electronic controller to receive power from the power supply and to access the audio data stored on the removable memory element,
        a mechanical switch providing user input into the electronic controller when directly manipulated by a user, and
        an audio driver in communication with the electronic controller to control an output to a speaker based at least in part on the user input.

2. The transactional card of claim 1, wherein the power supply is a supercapacitor.

3. The transactional card of claim 1, wherein the sheet includes a heat sensitive color-changing material.

4. The transactional card of claim 1, further comprising a lenticular array with an underlying image formed on the sheet.

5. A transactional card, comprising:
    a sheet of material including a machine readable element; and
    light producing circuitry affixed to the sheet, the circuitry further comprising:
        a power supply,
        a light emitting diode operative to emit light in the visible spectrum to backlight at least one of an account number permanently affixed to the sheet of material and a card holder's name permanently affixed to the sheet of material, and
        a mechanical switch to control the light emitting diode when directly manipulated by a user.

6. The transactional card of claim 5, wherein the sheet includes a material producing a scent.

7. The transactional card of claim 5, further comprising circuitry affixed to the sheet for producing sound.

8. The transactional card of claim 5, wherein the circuitry for producing visible light further includes a display circuit for producing an image.

9. The transactional card of claim 5, wherein the sheet has a heat sensitive color-changing material.

10. The transactional card of claim 5, further comprising a lenticular array with an underlying image formed on the sheet.

11. A transactional card, comprising:
    a removable memory element that contains audio data and display data;
    a sheet of material including:
        a material producing a scent;
        sound producing circuitry embedded within the sheet operative to access the removable memory element to produce sound according to the audio data;
        light producing circuitry embedded within the sheet operative to access the removable memory element to produce light according to the display data,
        wherein the light producing circuitry is separate from the sound producing circuitry; and
    a machine readable element affixed to the sheet of material.

12. The transactional card of claim 11, further comprising a power supply for providing electric power to the light producing circuitry and the sound producing circuitry, wherein the power supply is a supercapacitor.

13. The transactional card of claim 11, wherein the light producing circuitry is a display circuit for producing an image.

14. The transactional card of claim 11 wherein the light producing circuitry causes account numbers on the sheet to be illuminated.

15. The transactional card of claim 11, wherein the sheet has a heat sensitive color-changing material.

16. The transactional card of claim 11, further comprising a lenticular array with an underlying image formed on the sheet.

* * * * *